Patented Feb. 27, 1940

2,191,960

UNITED STATES PATENT OFFICE 2,191,960

UREA-FORMALDEHYDE MOLDING COMPOSITION AND PROCESS OF MAKING

Arthur M. Howald, Pittsburgh, Pa., assignor, by mesne assignments, to Plaskon Company, Incorporated, a corporation of Delaware No Drawing. Application September 13, 1930, Serial No. 481,807

9 Claims. (Cl. 260—69)

This invention relates to the manufacture of molding powders; and it comprises a molding powder hardening under heat and pressure, said powder containing in admixture a primary reaction product of urea and formaldehyde, containing or capable of developing free formaldehyde under conditions of heat and acidity and a material, usually urea or thiourea, capable of extracting or fixing such formaldehyde, said powder also containing such adjunctive ingredients (fillers, plasticizers, etc.) as may be desired; and it also comprises a method of making such a powder wherein urea is condensed with formaldehyde in the presence of water, the excess of water is removed, the condensation product is dried and powdered and is mixed with pulverulent urea, thiourea or resorcinol, together with such fillers, plasticizers or other adjuncts as may be desired; all as more fully hereinafter set forth and as claimed.

For a number of years, a vigorous but ineffectual search has been made for a reliable and economical method of making articles from the condensation products of urea and formaldehyde, capable of commercial application on a large scale. From a technical point of view, such articles are extremely desirable; properly hardened condensation products being glass-like in appearance and general properties and lacking the brittleness and frangibility of glass. The present invention provides such a method.

While various definite reaction products of urea and formaldehyde have been isolated and described, not much, if anything, is known as to the chemical constitution of these glassy materials and their production is on a completely empirical basis. And the laboratory methods described in the patents of the prior art neither lend themselves to large scale manufacture nor give reproducible results.

Urea and formaldehyde react energetically with considerable evolution of heat; but in the presence of the amount of water found in commercial 40 per cent formalin, the reaction becomes manageable. On dissolving urea in commercial 40 per cent formaldehyde solution, the weight of urea being about equal to that of the formaldehyde present, and heating to 100° C., vigorous reaction sets in with evolution of heat and the liquid begins to boil. Under a reflux, boiling will continue until the reaction is substantially complete. In the prior patented art, something like this is usually done, such a mixture being allowed to boil under internally developed heat for a time. Afterwards, the water is evaporated off sufficiently to produce a thick or viscid mass. This latter is baked, finally giving a hardened material of the glassy character described. Generally, the viscid liquid is cast into layers which, on baking, give solid slabs. From these slabs, the final articles are cut. Because of warping, shrinking and development of strains in baking, it is a matter of extreme difficulty to obtain slabs of any substantial thickness; or to make articles which will not crack and craze with time.

In the present invention, the process is abbreviated and a production of molded articles of any size or character is rendered possible by converting an initial reaction product formed by heating the reactants together in aqueous solution to a dry powder which is admixed with some powdered urea or its equivalent to give a pulverulent admixture susceptible of being converted into final form under ordinary molding pressures and at a relatively low temperature. This molding powder may comprise fillers where final transparency is not desired. Any tint or hue, including delicate pastel shades, may be given the final article by incorporation of dyes or pigments in the molding powder. A particularly desirable filler for the present purposes is fine ground scrap from the process itself; or fine ground hardened material made by the processes of the prior art. For reasons later appearing, I generally incorporate in the powder a plasticizer facilitating flow under heat and pressure and a material which, while not acid itself, is capable of developing acidity in the mold; a material, so to speak, of latent acidity.

In boiling the solution in the preliminary stage of my operation, alkalinity or acidity influences the course of the reactions considerably. Commercial formaldehyde solution is always quite acid and if it be used as it is, the actions take an undesirable course. The same is true if the mixture is made alkaline by addition of bases. I find it best to work near neutrality. With urea free from ammonia or alkaline constituents, I generally nearly neutralize the formaldehyde solution, bringing the pH value to around, say, 6.5. Any convenient base may be used in this neutralization. The free acid of formaldehyde being mostly formic acid, this neutralization produces a formate whose presence is unimportant. I frequently use triethanolamine as the neutralizing base. I can operate on either side of neutrality. No catalyst is necessary and, in particular, the catalytic action of the acid present in commercial formaldehyde is undesirable.

Boiling in the preliminary stages quickens operation but is not necessary, it being possible to obtain the material in the cold although the reaction takes longer.

In heating the urea and formaldehyde solutions together, any convenient type of apparatus, continuous or discontinuous, may be employed. During the period of initial energetic reaction, I try to maintain the temperature around 100° C. In working with large batches, cooling or dilution with more water may become necessary; the added water being boiled off. In using continuous apparatus, the urea may be dissolved in water and this solution added to a flowing stream of formalin solution passing through a tubular reaction apparatus at appropriate temperatures at different points. Reaction may be under pressure. I do not generally, however, desire temperatures going above 110° C.

As so far described, I have heated together urea and formaldehyde in the presence of water, producing a solution of reaction products. I next evaporate off the water of this solution, using any ordinary commercial rapid method of evaporation, such as spray drying or drum drying. With spray drying, since the sensible heat of the liquid sprayed must suffice for evaporation, it is sometimes desirable to superheat the cooked liquid prior to spraying. Spraying may, however, be into an atmosphere of hot gases. When drying as films on the surface of rotating steam-heated drums, this superheat is not necessary. In either method of drying, I operate to secure a dry product. With filmed material taken off hot drums, chilling is sometimes necessary to produce solidity. However produced, the dry material is next fine ground. In evaporation, the temperature should be under 110° C. as a maximum.

In the first stage of the operation, I generally maintain the mixture at about 100° C. for 30 minutes or thereabouts; using either a reflux condenser or a closed vessel, as may be most convenient. In boiling a mixture which is substantially neutral and which contains no catalyst, it is in general desirable to have a rather large proportion of formaldehyde present, say, about 2.15 molecules of formaldehyde for each molecule of urea. The molecular weight of urea being twice that of formaldehyde, in actual weights this corresponds to 1.075 parts of formaldehyde to 1 part of urea. In the final product submitted to heat and pressure for molded articles, on the other hand, a considerably less proportion of formaldehyde is desirable say 1.5 molecule, or thereabouts, per molecule of urea. Of course, in neither the preliminary reaction product nor in the final product is any substantial amount of formaldehyde or of urea actually present as such, but it is convenient in describing compositions to speak of the ratios of these two bodies.

In the initial stages of reaction it is, as stated, convenient to work with nearly neutral formaldehyde solution, the pH being between 6 and 6.8; advantageously around 6.5. In the final setting under heat and pressure, it is however desirable to have the mixture at that time considerably more acid. Development of acidity at any intermediate time is however not desirable, as it may lead to premature reaction.

Returning to the material leaving the evaporator, this is collected in solid form. If necessary, it may be chilled to solidify it. If the evaporation of water is substantially complete, the solid collected material may be thereupon ground to a fine powder. But if moisture is still present, it may be dried further in any ordinary type of drier, drying being before or after grinding, as may be most convenient. The drier the powdered primary reaction product is, the better; since volatiles must not be developed in the mold. In evaporation, it assists in the extrication of the last portions of water to add a little alcohol or other volatile substance to the solution before going to the evaporator.

The dry powder produced as described is one component of my molding powder. As stated, it contains a higher ratio of formaldehyde to urea than is later desirable. During the evaporating operation, it is permissible to add urea to the liquid to reduce this ratio. For example, in evaporating the liquid on a drum, dry urea may be mixed with the liquid going to the drum. No substantial reaction takes place during the drying and the added urea is well mixed with the primary reaction product. Similarly, urea solution may be mixed with liquid going to a sprayer.

With the dry powder produced as previously described, I admix enough urea or thiourea, as a dry powder, to bring the molecular ratio of formaldehyde to urea down to about 1.5:1. Either urea or thiourea will serve. In molding, urea gives a more rapid reaction and this is sometimes desirable and sometimes not. Instead of either urea or thiourea, I may use resorcinol and particularly if a slight amount of color in the final product is unobjectionable.

With the dry powder made as so far described, I next mix a small amount of a plasticizer which may be a phenol-formaldehyde resin condensed with a phthalic acid catalyst, or may be any other resin. Various natural resins can be used. The function of this resin is to act, so to speak, as a flux, permitting better flow under the heat and pressure in molding. It has no chemical action in molding and none on admixture with the cold powdered material. In order to produce acidity during and at the time of molding, it is convenient to dissolve in the resin used a certain amount of any convenient acid. Phthalic acid may be used. When the resin melts, the phthalic acid is liberated and produces acidity of the whole mixture. Another substance which may be used is B-brom hydrocinnamic acid. When heated, this liberates hydrobromic acid.

The molding powder as so far described, by heating in molds under the usual molding pressure of a ton or so per square inch and at a temperature of 120° C. or somewhat higher, gives clear, glass-like shaped articles, readily clearing the molds without cooling and free from stresses and strains.

Where a filler, such as wood flour, is to be used, it may be admixed at any stage of the operation. It is advantageous to admix it with the liquid prior to evaporation. The use of drying apparatus, rather than evaporators, then becomes practicable.

With a molding powder made as described, the glassy product is formed in the mold during molding at the joint expense of the condensation product formed in boiling and of the added urea; that added prior to evaporation and that added in the dry form. There is, so to speak, an equalization of formaldehyde between the two, with some development of heat; the net result being the production of the glassy material in situ. A mixture of dry urea and dry formaldehyde (paraform) in a hot mold undergoes a violent and uncontrollable reaction with development of high temperatures and the liberation of volatiles. With a preliminary reaction between the formaldehyde and some of the urea, the reaction of the dry condensation product with the rest of the urea in the mold becomes smooth and uniform with only a moderate development of heat. The reaction of the condensation product with the urea takes place in an acid medium; which is favorable to the production of the glassy body. Acidity of any substantial degree is avoided up to the time of final molding. All the added urea required can be admixed in the dry form with the dry condensation product and none during evaporation. But generally I add some during evaporation; correspondingly diminishing the amount of dry urea in the molding powder. That added during evaporation goes into solution but does not undergo substantial reaction in the short time afforded in spray drying or drum drying. Sometimes, it is better to add more urea in the dry form as a physical mixture with the condensation product and less during evaporation and, sometimes, the reverse is true.

In a specific embodiment of the present invention, representing an actual operation, I evaporated in stages and added urea also in stages. In so doing, I used a batch including 24 pounds of commercial 36 per cent formaldehyde solution which was distinctly acid. I added an ounce of triethanolamine which brought the pH value to 6.4. To this solution, I added 8 pounds of commercial urea and heated the resulting solution under a reflux condenser to keep the volume constant and prevent loss of formaldehyde. The mixture was boiled for 30 minutes, most of the boiling being by internal heat. Removing the reflux, the mixture was boiled down to about 18 pounds. During the boiling and evaporation, the temperature ranged between 100° C. and 110° C. To the hot concentrated mixture was added 1.5 pounds of urea and the mixture evaporated and cooled; the total operation taking about 10 minutes with the evaporator used. The evaporated and cooled product was solid and fusible and soluble in water. In this particular operation, no filler was used. The solid cooled material was ground, dried and mixed with a resin produced by condensing phenol with formaldehyde and using phthalic acid as a catalyst and having about 10 per cent excess phthalic acid in solution. This particular preparation had a melting point of 80° C. To the mixture, I added further solid, dry urea; the amount added being that required to give a total ratio of formaldehyde to the urea of 1.5:1; in this case one pound for the batch stated. The dry powder was then further dried to give a molding powder capable of being stored and packaged.

This molding powder, when placed in a mold and submitted to the usual pressure of about a ton to the inch and at a temperature of 140° C., entered into reaction with the production of a good, permanent, glassy and clear molded article. At the temperature used, the added resin melted and liberated the phthalic acid, making the whole composition acid when the temperature of 80° C. was reached.

In another operation using a filler, the procedure and quantities were the same, save that the filler was mixed with the boiled down liquid, taking it up and producing a mixture which could be readily dried. It was dried, in this case, by exposure on shelves in a warm circulated atmosphere. The cooled dry mass was ground to a fine powder which was then mixed with plasticizer and urea as before. Molding was under the same conditions.

Where no filler or dye is used, the molded material is hard, infusible, insoluble, transparent and water-white; and is free of internal stresses or strains which would lead to cracking under temperature changes or in storage. With the molding powder well dried and with urea used in the proper proportion, it is free of contained volatiles, which is one of the reasons for its permanency. It is not pervious. This is an important advantage of the shaped articles formed with the molding powder of the present invention. By dissolving a dye in the material in the liquid stage, delicate pastel shades may be produced. By the use of white fillers an economy is given and articles of porcelain-like character can be produced. The material in either case has good insulating and dielectric properties. It is water and light resistant and does not undergo chemical change with time.

Resorcinol, though not of the urea type, is the equivalent of urea as the additive material for the present purposes, where pure white products are not desired. Either urea or thiourea may be used as the additive material in producing the molding powder, but their action is specifically different. The rate of reaction of the urea is considerably greater than that of thiourea and for this reason, if evaporation occupies any considerable time, it is better to use thiourea. As stated, it is desirable to postpone to the molding step all chemical reaction after the initial condensation. The more rapid reactivity of urea, as compared with thiourea, may be advantageous in the molding operation. Urea and resorcinol will withstand a higher temperature in molding than will thiourea; and the molding temperature need not be so closely controlled.

The amount of resin used in the molding powder depends upon its character. It is employed as a plasticizer and as a blending agent. Its fluxing properties are also important; and particularly where reground old material is used as a filler. In addition to the phenol formaldehyde acid resin mentioned, other commercial resins may be employed, such as the "Glyptal" type (glycerin or glycol with a polybasic acid, such as phthalic, succinic, etc.). Ester gum and various natural resins, such colophony, may be used.

The amount of resin used in the powder depends to some extent upon its properties and the results desired. With a resin produced by condensing phenol with formaldehyde with phthalic acid as a catalyst, and containing 10 per cent phthalic acid in solution, an addition to form 10 per cent of the molding powder (without filler) is generally sufficient. About the same proportions of the above mentioned glyptal type resins are suitable. These may be made with about 10 per cent excess acid incorporated therein.

Where a filler is used, its choice depends upon the kind of article desired. For porcelain effects, blanc fixe is good. Whiting has a neutralizing effect not here desirable. Wood flour and asbestos are good fillers for special purposes. Colored pigments of the type of those used in paints may be employed for special purposes.

While I have described more particularly the use of urea itself in making these glassy final products with the aid of formaldehyde, the various aryl and alkyl substituted ureas may be employed in the same ways, giving specifically different products. Thiourea may be used in lieu of urea in making the initial condensation product. There are various other materials which, though not urea or of the urea type, nevertheless can be employed in making similar glassy final products, among them being guanidin, cyanamid, dicyandiamid, ammonium thiocyanate and ammonium cyanate. With all these substances, in the preliminary reaction with formaldehyde, a large amount of heat is liberated and it is advantageous to use the principles of the present invention: uniting the formaldehyde in a substantially pure neutral solution with some of the urea, or other substance, whereby the heat of reaction can be conveniently dissipated, and then converting the condensation product into a dry powder, and mixing this powder with enough dry urea, or one of the described equivalents, to complete the reaction in a hot mold.

The molecular ratios given are not rigidly necessary. In the initial stage of operation, the amount of formaldehyde necessary depends somewhat on the alkalinity of the mixture and the ratio 2:1 is merely an approximation. Similarly, in the molding stage, the ratio 1.5:1 is not rigid, since good results may be obtained with 1.8:1 and intermediate ratios.

In molding, a temperature of 120° to 150° C. and a pressure of 2000 pounds per square inch may be employed.

In evaporating and drying there is, or may be, a loss of formaldehyde in the gaseous form. Where drying is by circulating gases, this escaping formaldehyde can be conveniently taken up by water and returned to the process therewith.

What I claim is:

1. An improved molding composition containing a urea-formaldehyde condensation product, suitable for making molded articles by hot pressing, said composition being dry and substantially free of uncombined volatile bodies, and comprising a fixing agent and a primary urea-formaldehyde condensation product having formaldehyde combined with urea in the approximate molar ratio of 2:1, said condensation product being fusible and capable of heat-hardening with liberation of formaldehyde at molding temperatures and said fixing agent being capable of combining with and fixing formaldehyde liberated during said molding, the amount of said fixing agent being sufficient to reduce the overall ratio of formaldehyde to urea and fixing agent to approximately 1.5:1.

2. The product of claim 1 in which said fixing agent is a urea.

3. The product of claim 1 in which said fixing agent is thiourea.

4. The product of claim 1 in which said fixing agent is urea.

5. The process of making an improved molding powder which comprises producing a primary reaction product of formaldehyde with urea by reacting formaldehyde with urea in a substantially neutral aqueous solution in the ratio of approximately 2 mols of formaldehyde to 1 of urea, completely drying the reaction product thus obtained to remove the water and other volatiles and to arrest the reaction and then powdering said product and admixing a pulverulent formaldehyde-fixing reagent therewith, the said formaldehyde-fixing reagent being added in an amount sufficient to reduce the ratio of formaldehyde combined with a urea in the final product to about 1.5:1.

6. The improved process of making a molding powder which comprises producing a primary reaction product of the urea-formaldehyde type by reacting formaldehyde with a urea in a substantially neutral aqueous solution in approximately the ratio of 2 mols of formaldehyde to 1 mol of a urea, completely drying the reaction product thus obtained by spray drying to remove water and other volatiles and to arrest the reaction and then powdering the said dried product and admixing a sufficient amount of pulverulent urea therewith to reduce the ratio of the formaldehyde combined with the urea in the final product to about 1.5:1.

7. As a new improved molding powder, suitable for making molded articles by hot pressing, an admixture of a powdered primary reaction product of urea with formaldehyde and pulverulent urea, said reaction product being fusible and capable of heat hardening with liberation of formaldehyde at molding temperatures and having a ratio of formaldehyde to urea of about approximately 2 to 1, the said ratio being greater than that desired in the final molded product, and the said pulverulent urea being present in amount sufficient to reduce the over all ratio of formaldehyde to urea in the final product to about 1.5:1.

8. Process of preparing a moldable composition comprising preparing an aqueous solution of a urea formaldehyde condensation product, drying, comminuting and mixing a minor amount of pulverulent thiourea therewith.

9. Process of preparing a moldable composition comprising preparing an aqueous solution of a urea formaldehyde condensation product, drying, comminuting and mixing a minor amount of pulverulent urea therewith.

ARTHUR M. HOWALD.